UNITED STATES PATENT OFFICE.

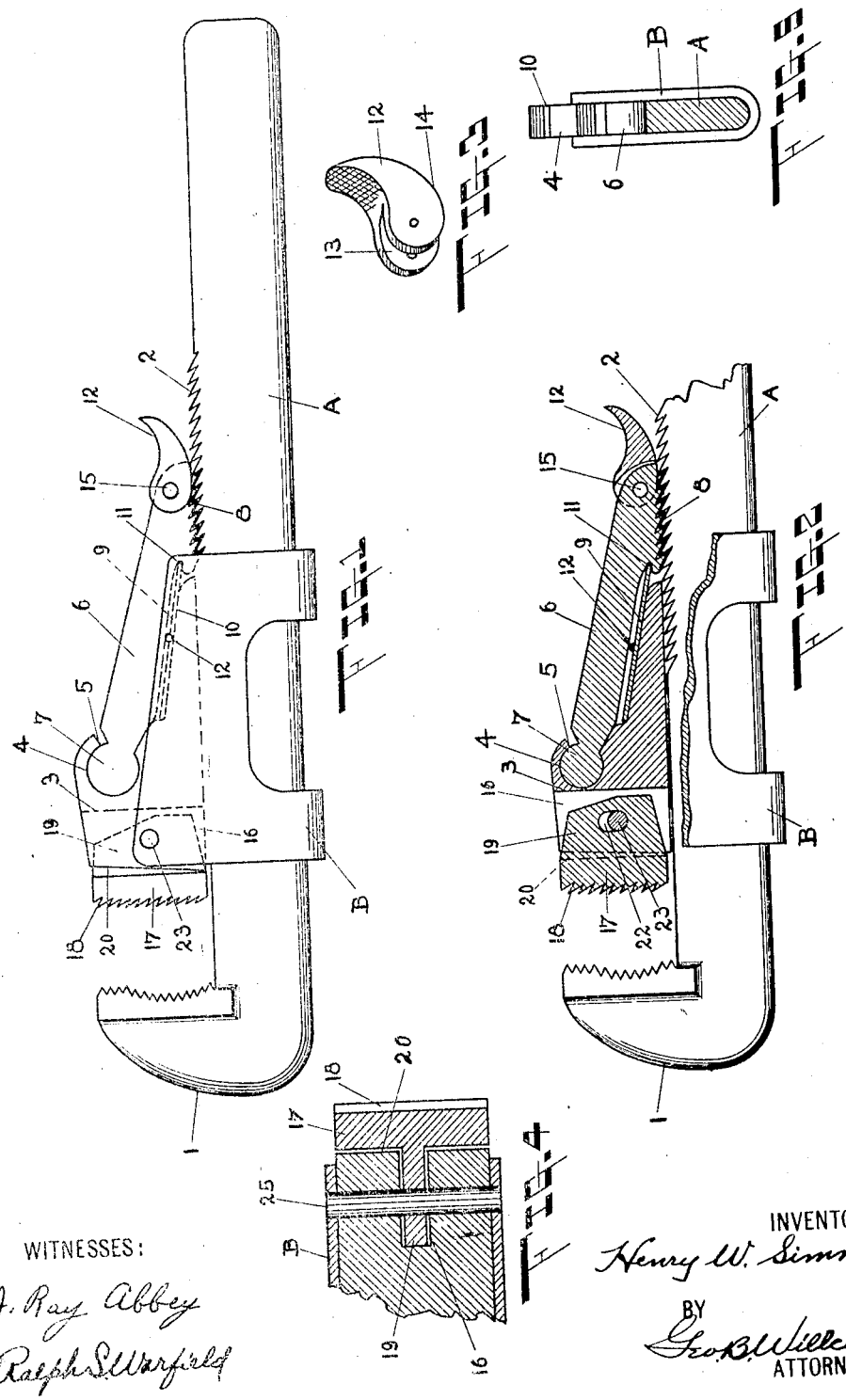

HENRY W. SIMMS, OF BAY CITY, MICHIGAN.

PIPE-WRENCH

No. 882,272.  Specification of Letters Patent.  Patented March 17, 1908.

Application filed April 20, 1907. Serial No. 369,280.

*To all whom it may concern:*

Be it known that I, HENRY W. SIMMS, a citizen of the United States, residing at Bay City, in the county of Bay and State of Michigan, have invented certain new and useful Improvements in Pipe-Wrenches; and I do hereby declare the following to be a full, clear, and exact description of the invention, such as will enable others skilled in the art to which it appertains to make and use the same.

This invention relates to wrenches, one object of which is to provide a quick and accurate adjustment capable of manipulation by the hand of the operator grasping the wrench.

Another object is the provision of a pipe jaw or head capable of application to a wrench.

A further object is the provision of a neat, simple and inexpensive device capable of being easily and quickly assembled and disassembled.

A still further object is the provision of a pipe jaw head which operates automatically to engage and release the work without the employment of springs.

Still another object is the provision of a wrench consisting of but few parts which can be easily manufactured and kept in stock.

To these and other ends, therefore, my invention consists in certain novel features and combinations, together with their equivalents, such as will be more fully described, hereinafter and particularly pointed out in the claims.

In the accompanying drawings, Figure 1 is a side view of a construction embodying one form of my invention; Fig. 2 is a similar view partly broken away; Fig. 3 is a detail perspective view of the thumb latch; Fig. 4 is a detail cross sectional view of the pipe wrench head; and Fig. 5 is an end view of the jaw parts being shown in cross section.

(A) indicates the stock or handle of a wrench provided with a rigid jaw (1) which may be toothed or not, as desired, the inner face of the handle having teeth (2) formed thereon.

(B) indicates a strap preferably U-shaped in cross section, the strap embracing and sliding relative to the handle (A). The lower jaw (3) is received between and secured to the free ends of the strap (B). The base of the movable jaw rests against or adjacent to the toothed edge of the handle (A), the movable jaw being approximately right-triangular in shape.

Near the outer end of the movable jaw (3) and beyond the ends of the strap (B) is formed a socket (4), one wall of which is prolonged, as at (5) to form a stop, for a purpose hereinafter set forth.

A dog (6) is provided, one end (7) of the dog being rounded and movably received in the socket (4) in such manner that the dog is permitted a movement toward and from the toothed edge of the handle, the dog extending obliquely from the outer end of the movable jaw (3) toward the handle, the rear end of the dog being provided with teeth (8) adapted to mesh with teeth (2) of the handle.

A leaf spring (9) having one end engaging the jaw (C) near the socket (4), is provided, the spring extending rearwardly between the inclined face (10) of the jaw and the inner inclined face of the dog (6), the rear end of the spring engaging the rear end of the dog, as shown at (11), whereby the teeth (8) of the dog are caused at all times to engage the toothed edge of handle (A).

A pin (9ª) extending between the ends of the strap (B) and above the spring normally retains the latter in position.

Located at the extreme end of the pawl or dog is a curved thumb lever (12), the same being slotted at its forward end, as at (13), to receive the rear end of the pawl or dog (6). The curved under-face (14) of the thumb lever rests upon the toothed edge (2) of the handle, the arc of curvature of the lever being such that by depressing the outer free end of the lever (12), the inner slotted end of the lever will be raised, carrying with it the rear end of the pawl or dog (6) against the tension of spring (9) to release the teeth (8) of the pawl from the teeth (2) of the handle (A) and allow the movable jaw and strap to be slid relative to the stationary jaw (1). The slotted end of the thumb lever (12) is pivoted to the rear end of pawl (6), as at (15). The stop (7) operates to limit the outward movement of the pawl (6) from the handle (A).

One end of the spring (9) is loosely received in a kerf (11) in the dog or pawl (6), and to remove the pawl from the wrench, all that is necessary is to pull the rear end of the pawl outward from the handle until it clears the free ends of the strap (B) whereupon a lateral movement of the pawl will disengage the latter from the socket (4) and spring (9), a reversal of this movement resulting in replacing the pawl.

When the wrench is in use, the pressure brought to bear against the outer end of the movable jaw will be sustained by the pawl or dog which serves as a brace transmitting pressure directly to the handle, the inclination of the pawl being in the line of pressure exerted upon the movable jaw.

The curved under face of the thumb lever readily slides over the teeth of the handle without any appreciable amount of friction or wear.

It is obvious that the movable jaw (3) may be solid for use as a monkey wrench, but I have shown the jaw (3) as being provided with a kerf (16) adapted to receive a movable pipe wrench head (17) toothed, as at (18), the pipe wrench head being T-shaped in cross section, the web (19) of the head being received in the kerf (16). The under face of the body portion of the head rests upon the jaw, which jaw is cut away on an incline as at (20), to enable the pipe wrench head to rock or oscillate back and forth. By cutting away the jaw as at (20), the head is permitted a sliding reciprocatory play necessary to a pipe wrench and when the head (17) slides toward the outer end of the face (20) of the jaw (3) it may be released from the work either to remove the wrench or to permit a fresh hold being obtained.

The web of the head is provided with an enlarged aperture (22) through which a pin (23) passes, the pin being seated in the ends of the strap (B) and the web (19) is preferably rounded slightly to facilitate the rocking motion.

The body portion of the head at either limit of its movement will rest squarely upon the face (20) of the jaw (3) and the play afforded the head (17) by the enlarged aperture (22) coöperates with the clearance afforded by the inclined face (20) of the jaw to permit the head to alternately grip and release the work as the wrench is moved back and forth in the arc of a circle.

Having thus fully disclosed my invention, what I claim as new is—

1. A wrench comprising a toothed handle, a jaw slidable thereon, a rigid lever pawl, one end of which is pivotally connected to the jaw, the sides of the jaw being cut away to loosely receive and guide the lever pawl, the opposite end of the pawl extending beyond the jaw and being toothed, the teeth meshing with the teeth on the handle, a spring separate from the pawl for normally maintaining the teeth of the pawl in engagement with the teeth of the handle, the pawl being removable from the jaw against the tension of the spring, and a dog extending rearwardly from the pawl and in substantial alinement therewith, the head of the dog being eccentric and pivotally connected to the toothed end of the pawl, and resting on the toothed edge of the handle, the tail of the pawl being upcurved away from the handle, the dog and pawl forming a toggle.

2. A wrench comprising a toothed handle, a jaw slidable thereon, the jaw having a kerf therein, a T-shaped head, the web of the head being loosely received in the kerf, the web being slotted transversely, a pin passing through the slot and the walls of the kerf, teeth on the head, a rigid lever pawl, one end of which is pivotally connected to the jaw, the sides of the jaw being cut away to loosely receive and guide the lever pawl, the opposite end of the pawl extending beyond the jaw and being toothed, the teeth meshing with the teeth on the handle, a spring separate from the pawl for normally maintaining the teeth of the pawl in engagement with the teeth of the handle, the pawl being removable from the jaw against the tension of the spring, and a dog extending rearwardly from the pawl and in substantial alinement therewith, the head of the dog being eccentric and pivotally connected to the toothed end of the pawl, and resting on the toothed edge of the handle, the tail of the pawl being upcurved away from the handle, the dog and pawl forming a toggle.

3. A wrench comprising a toothed handle, a jaw slidable thereon, the jaw having a kerf therein, a T-shaped head, the web of the head being loosely received in the kerf, the web being slotted transversely, a pin passing through the slot and the walls of the kerf, the upper kerfed edge of the jaw being slanted downward at an angle to the gripping position of the head, the head sliding on such slanted edge, teeth on the head, a rigid lever pawl, one end of which is pivotally connected to the jaw, the sides of the jaw being cut away to loosely receive and guide the lever pawl, the opposite end of the pawl extending beyond the jaw and being toothed, the teeth meshing with the teeth on the handle, a spring separate from the pawl for normally maintaining the teeth of the pawl in engagement with the teeth of the handle, the pawl being removable from the jaw against the tension of the spring, and a dog extending rearwardly from the pawl and in substantial alinement therewith, the head of the dog being eccentric and pivotally connected to the toothed end of the pawl, and resting on the toothed edge of the handle, the tail of the pawl being upcurved away from the handle, the dog and pawl forming a toggle.

In testimony whereof, I affix my signature in presence of two witnesses.

HENRY W. SIMMS.

Witnesses:
L. G. SCHUESSLER,
GEORGE P. COBB.